US012667910B2

(12) United States Patent
Greil

(10) Patent No.: US 12,667,910 B2
(45) Date of Patent: Jun. 30, 2026

(54) METHOD FOR DEFINING A LASER CONTROL SIGNAL FOR VARIOUS TYPES OF LASERS AND LASER PLOTTERS, AND GALVO MARKING LASERS THEREFOR

(71) Applicant: Trotec Laser GmbH, Marchtrenk (AT)

(72) Inventor: Josef Siegfried Greil, Rohr im Kremstal (AT)

(73) Assignee: Trotec Laser GmbH, Marchtrenk (AT)

( * ) Notice: Subject to any disclaimer, the term of this patent is extended or adjusted under 35 U.S.C. 154(b) by 363 days.

(21) Appl. No.: 18/551,948

(22) PCT Filed: Mar. 17, 2022

(86) PCT No.: PCT/AT2022/060078
§ 371 (c)(1),
(2) Date: Sep. 22, 2023

(87) PCT Pub. No.: WO2022/198249
PCT Pub. Date: Sep. 29, 2022

(65) Prior Publication Data
US 2024/0181561 A1     Jun. 6, 2024

(30) Foreign Application Priority Data
Mar. 24, 2021    (AT) ............................... A50202/2021

(51) Int. Cl.
*B23K 26/062*          (2014.01)
*B23K 26/082*          (2014.01)
(Continued)

(52) U.S. Cl.
CPC ........ *B23K 26/0626* (2013.01); *B23K 26/359* (2015.10); *B23K 26/38* (2013.01); *B23K 26/082* (2015.10)

(58) Field of Classification Search
None
See application file for complete search history.

(56) References Cited

U.S. PATENT DOCUMENTS

| | | | |
|---|---|---|---|
| 5,283,794 A | 2/1994 | Gibbs et al. | |
| 5,376,770 A | 12/1994 | Kuhl et al. | |
| 11,958,130 B2 * | 4/2024 | Hofinger ................ | B23K 26/36 |

FOREIGN PATENT DOCUMENTS

| | | |
|---|---|---|
| DE | 19542973 A1 | 5/1996 |
| JP | 2001287056 A | 10/2001 |
| WO | 2020041656 A1 | 2/2020 |

OTHER PUBLICATIONS

International Search Report and Written Opinion for International Application No. PCT/AT2022/060078, date mailed Oct. 4, 2022, 14 pages.

* cited by examiner

*Primary Examiner* — Ryan A Jarrett
(74) *Attorney, Agent, or Firm* — KOWERT, HOOD, MUNYON, RANKIN & GOETZEL, P.C.; Gareth M. Sampson

(57) ABSTRACT

The present disclosure relates to a laser plotter, a galvo marking laser and a method for defining a laser control signal for a laser source for various types of laser machines, for cutting, engraving, marking and/or lettering of a workpiece, in which at least one laser source is used in a housing of the laser machine type for processing a workpiece. A PWM signal for controlling the laser source is generated by a control unit. The workpiece is deposited on a processing table and the processing of the workpiece carried out line by line, whereby a separate PWM signal for driving the laser source is generated for each line. At a defined edge, a correction process is carried out to generate a modified PWM signal, wherein the correction process determines the preceding pause duration and the pulse duration, from which a correction value and a correction factor, respectively, are determined.

9 Claims, 3 Drawing Sheets

(51) Int. Cl.
    *B23K 26/359*     (2014.01)
    *B23K 26/38*     (2014.01)

METHOD FOR DEFINING A LASER CONTROL SIGNAL FOR VARIOUS TYPES OF LASERS AND LASER PLOTTERS, AND GALVO MARKING LASERS THEREFOR

This application is a U.S. National Stage filing of International Application No. PCT/AT2022/060078, filed Mar. 17, 2022, titled "METHOD FOR DEFINING A LASER CONTROL SIGNAL FOR DIFFERENT LASER TYPES, AND LASER PLOTTER AND GALVO MARKING LASER THEREFOR", which claims the benefit of priority to the Austrian Application No. A50202/2021, filed Mar. 24, 2021. All of the aforementioned applications are incorporated herein by reference in their entireties.

BACKGROUND

Technical Field

The present disclosure relates to a method for defining a laser control signal for various laser machine types, in particular laser plotters or galvo marking lasers, for cutting, engraving, marking, and/or lettering of a workpiece.

Description of the Related Art

Laser processing devices in which one or more laser sources are operated in alternating fashion are known from the prior art. Such laser plotters have a belt-driven carriage, on which a focusing unit, also adjustable, is arranged. Preferably, flat workpieces such as paper, plates, textiles, ballpoint pens, cell phones, tablets, etc. are processed by a laser, in particular a laser beam, which is conveyed from the laser source via deflection elements to the focusing unit and is deflected by the focusing unit in the direction of the workpiece.

So-called galvo lasers are also known, in which the laser beam is positioned via at least one adjustable mirror above the workpiece deposited in the processing chamber.

The various types of lasers, in particular laser plotters or galvo lasers, have a control unit for control and regulation of all components. Furthermore, the laser sources are controlled by a so-called PWM unit (pulse width modulation unit) with a PWM signal, i.e. the power of the laser sources is controlled by the PWM signal, whereby the PWM signal is variable in frequency and duty cycle, depending on the specification of the control unit.

A disadvantage of the solutions from the prior art is that due to non-ideal characteristics of real laser sources, deviations between the measured actual power and the set target power always occur. This effect varies with frequency and duty cycle and leads to unexpected and undesirable application results in machining, especially engraving. For example, in laser engraving applications, visible differences from the original occur in case of higher-frequency intensity changes.

In particular, such errors usually occur at the beginning of a machining process, so that manufacturers of such laser types use appropriate compensation methods to compensate for the errors, in which, for example, constant pulse lengthening, i.e. an increase in the duty cycle, is used. However, this compensates for undesirable characteristics only in a limited range of frequency/duty cycle combinations, where in other ranges these can then even be amplified.

Thus in many cases it is necessary that for the actual processing some tests with a wide variety of settings must be accomplished, in order to be able to manufacture a workpiece and/or object with sufficient engraving quality.

SUMMARY

The objective of the present disclosure is to provide a method for defining a laser control signal for various types of lasers, in which, on the one hand, the above-mentioned disadvantages are avoided and, on the other hand, a high engraving quality is created over a wide range.

The objective is achieved by the present disclosure. Advantageous embodiments or process measures, respectively, are described in the appended claims.

The objective of the present disclosure is achieved by a method for defining a laser control signal for various types of laser machines, in particular laser plotters or galvo marking lasers, for cutting, engraving, marking and/or lettering of a workpiece when at a defined edge, in particular the falling edge, of the PWM signal, a correction process is carried out for generating a preferably modified PWM signal, in particular a laser control signal, wherein the correction process determines the previously lying pause duration and the pulse duration, from which a correction value or correction factor is determined or calculated.

The advantage here is that due to the correction, in particular the correction process, the PWM signal achieves the best possible quality already at the start of the machining process, in particular the engraving process, since consideration is given to the laser sources via the correction process, so that the best possible quality is available. In this case, if the machining-process continues for a longer time, the correction or the correction factor of the normal PWM signal usually becomes smaller and smaller or is reduced, so that after a certain duration of the machining no more correction is required.

In particular when the laser source or beam source is cold, as is the case with longer pauses, the quality suffers at the beginning of the machining process. As a result, according to the prior art a test engraving is often performed first to heat the radiation source to operating temperature, after which the planned machining process is performed. However, this is no longer necessary with the solution according to the present disclosure, since the laser pause is taken into account for the creation of the correction value, so that a longer correction signal is also generated with a longer laser pause than if the laser is operated repeatedly in quick succession.

If, as is known from the prior art, the laser power has to be set to a very high level in order to obtain the fine lines of an engraving, then when the laser source is switched off, i.e. when no engraving is to take place, there is a further power output (afterglow) from the laser source, which can lead to a blurred engraving. A significant advantage with the solution according to the present disclosure is that a lower power setting of the laser source is made possible due to the correction process. This results in less tailing, i.e. afterglow of the laser source, whereby the quality of the engraving is significantly improved.

The low power setting also ensures less material stress on the workpiece, so that even very thin workpieces, such as foils, ribbons, etc., can be processed. Thus, sensitive materials can be processed better. Furthermore, this ensures that a uniform behavior of the laser power is achieved for differing stroke lengths of the carriage during engraving. Application of the correction process also makes it possible that laser sources with high power can be used in the lower power range.

However, advantageous embodiments are also such where after the start of the correction process first a duration of a past laser pause or pause duration and the duration of the pulse duration of the subsequent PWM signal is determined. This ensures that conclusions can be drawn about the response behavior of the laser source on the basis of the past laser pause or pause duration, respectively, so that an optimum adaptation of the correction signal is made. If, for example, a laser source is used frequently in rapid succession; the response behavior changes so that this is detected by the correction process and the correction value is adjusted accordingly, in particular shortened. If, on the other hand, the laser is not used for a longer period of time, it is assumed that the response behavior changes and thus a corresponding value is used. Of course, it is also possible that the laser sources are equipped with temperature sensors so that their actual temperature can be detected and taken into account when determining the response or correction value, respectively.

However, advantageous embodiments are also such in which depending on the length of the duration for the laser pause or pause duration, respectively, a correction value or correction factor, respectively, is determined which modifies, in particular lengthens, the PWM signal. This ensures that if the laser source is down for too long, i.e. if the response behavior of the laser source changes, a higher power or longer correction value, respectively, is used at the start of the work process than during continuous use.

Advantageous embodiments are such in which the correction process is carried out in a separate control module. This makes it possible to retrofit laser devices that are already installed. The control module is simply connected to the PWM generator or PWM unit, respectively, instead of the laser source, and the control module is then connected to the laser source. Thus, the laser device can be operated, since the control module independently detects the generated PWM signal, evaluates it and adds a corresponding correction value.

Advantageous embodiments are such where the correction process in the pulse generator is performed after the generated PWM signal.

Furthermore, it is also advantageous if the correction process is integrated before the pulse generator. i.e. directly during the generation of the PWM signal.

However, it is also possible to have the correction process integrated into the control unit or the laser source.

Furthermore, the objective of the present disclosure is also achieved by a laser plotter, in which the laser plotter, in particular its controller, the PWM generator, the pulse generator, the control module or the laser source, is designed for determining a laser control signal or corrected PWM signal for the laser source for cutting, engraving, marking and/or lettering of a workpiece by means of a correction process.

Finally, the objective of the present disclosure is also achieved by a galvo marking laser, in which the galvo marking laser, in particular its controller, the PWM generator, the pulse generator, the control module or the laser source, is used for determining a laser control signal or corrected PWM signal (19a) for the laser source (4), for cutting, engraving, marking and/or lettering of a workpiece (7) by means of a correction process (21).

The invention is now described in the form of an embodiment example, whereby it is emphasized that the invention is not limited to the exemplary embodiment or solution shown and described, but can be applied to equivalent solutions.

4

DETAILED DESCRIPTION OF EMBODIMENTS

Figure 1:
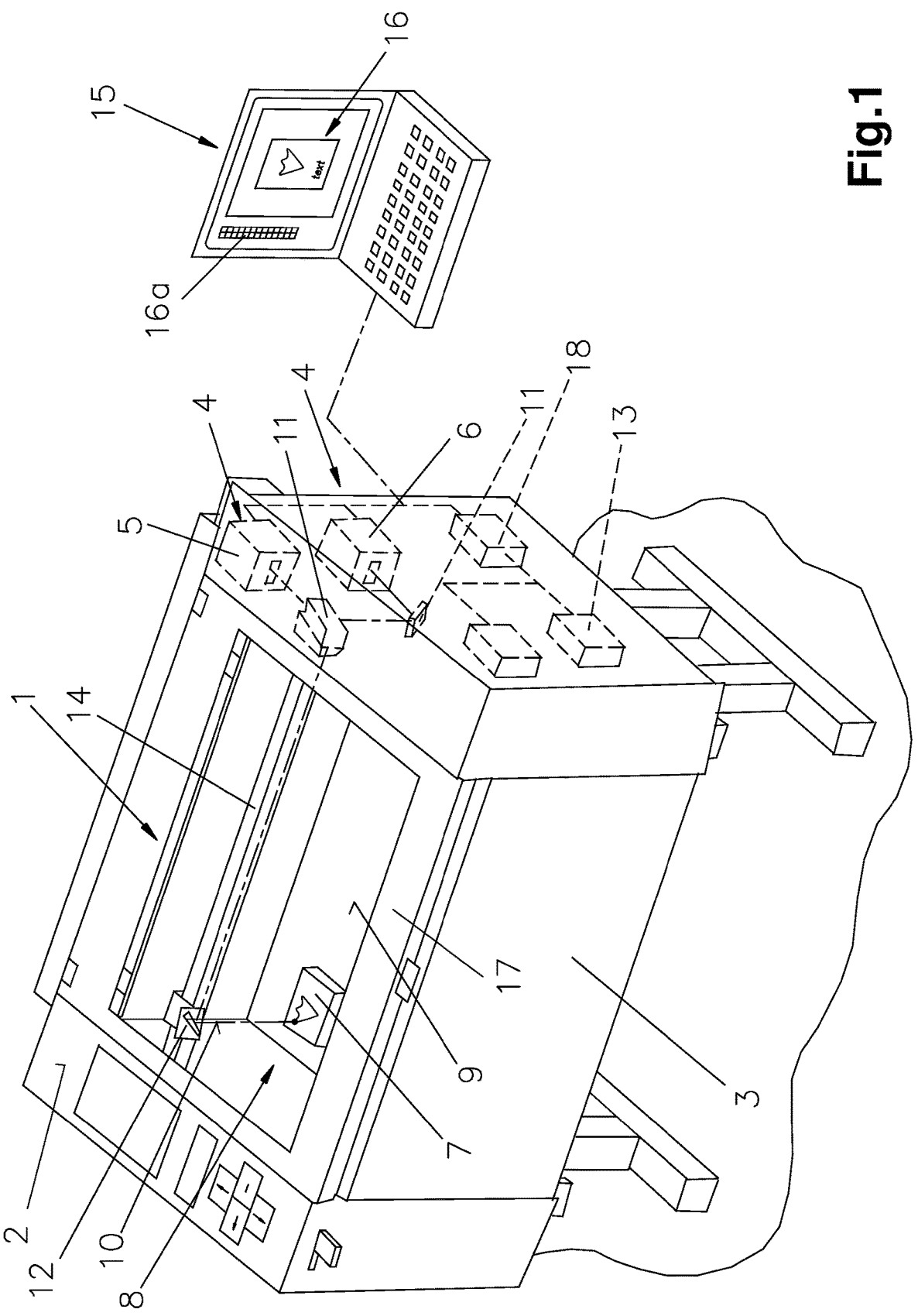
FIG. 1 is a schematic representation of a laser device for processing a workpiece by means of a laser process, simplified, for illustrative purposes only.

By way of introduction, it should be noted that in the various embodiments, identical parts are provided with identical reference signs or identical component designations, respectively, and the disclosures contained in the entire description can be applied mutatis mutandis to identical parts with identical reference signs or identical component designations, respectively. The positional information selected in the description, such as top, bottom, side, etc., likewise refers to the figure described and is to be transferred to the new position mutatis mutandis in the event of a change of position.

FIGS. 1 to 5 show an exemplary embodiment of a laser machine type 1, in particular a laser plotter 2 or galvo laser (not shown), in which a method for determining a laser control signal for a laser source for various laser machine types for cutting, engraving, marking and/or lettering of a workpiece is carried out.

At least one, in particular two, radiation sources 4 or laser sources 4 in the form of lasers 5, 6, respectively, are arranged in a housing 3. The lasers 5 and 6 preferably act in alternating fashion on the workpiece 7 to be processed, whereby the workpiece 7 is positioned in a processing chamber 8 of the laser plotter 2, in particular on a processing table 9, and the processing table 9 is preferably adjustable in height. A laser beam 10 emitted by the irradiation source 4 is sent via deflection elements 11 to at least one movable focusing unit 12, from which the laser beam 10 is deflected in the direction of the workpiece 7 and focused for processing. The control, in particular the position control of the laser beam 10 in relation to the workpiece 7 is carried out via software running in a control unit 13, whereby the workpiece 7 is preferably processed line by line by adjusting a carriage 14, on which the focusing unit 12 is also movably arranged, via preferably a belt drive in the X-Y direction. In this case, the machining process of the laser beam 10, in particular the engraving, is carried out line by line, i.e. the focusing unit 12 is moved from one side of the carriage 14 in the opposite direction, whereupon the carriage 14 is shifted by one line. Of course, it is possible that certain positions in the processing area can be approached directly, i.e. that first the carriage 14 is moved to the line to be processed, whereupon the focusing unit 12 is moved, or this can also be done vice versa.

On an external component 15, in particular a computer or a control unit, a graphic 16 and/or a text 16 is created via a commercially available software 16*a*, such as CorelDRAW, Paint, etc., or the user's own application software, which is exported or transferred to the control unit 13 of the laser plotter 2 in the form of a job, which performs a conversion of the transferred data, in particular the graphic 16 and/or the text 16, for controlling the individual elements of the laser plotter 2. Of course, it is also possible that the input can be made directly at the laser plotter 2 or that a corresponding job is loaded from a superordinate storage medium, such as a cloud. After the data have been transferred, the laser plotter 2, in particular its controller 13, processes the job. It is possible for several jobs to be stored simultaneously in the laser plotter 2 and processed sequentially.

In such laser plotters 2, it has been common practice up to now for a lid 17, which is preferably at least partially transparent 17*a*, to be closed by the laser plotter 2 in order to start a job to be processed. Subsequently, the operating staff can position the laser dot or a laser pointer, respectively, manually or automatically to the inserted workpiece 7, whereupon the job for processing the workpiece 7 can be started. At the end of the job, the machining process is terminated, the carriage 14 is moved to the home position, and the finished workpiece 7 can be removed so that a new machining process can be started.

To generate a laser beam 10, the laser source 4 or irradiation source 4, respectively, is controlled by a PWM generator 18, as schematically shown in FIGS. 3 to 6. Here, the laser source 4 is usually controlled at each PWM pulse 19 so that the laser beam 10 is generated, i.e., a corresponding PWM pulse 19 is generated for each image point 20, as schematically drawn in the control diagram in FIG. 2, which is then transmitted to the laser source 4. Due to the non-ideal characteristics of the real laser sources 4, deviations, in particular delays, occur between the PWM pulse 19 and the generated laser beam 10, which influences the quality of the machining process. Particularly in case of cold laser sources 4, there is power loss in the laser beam 10 due to the altered response behavior of the laser source, so that the quality of the engraving produced is often not optimal at the beginning of a machining process, in particular an engraving process, in which the laser source 4 has not yet reached the operating temperature. This can also result in quality losses during the machining process if longer pauses occur, for example, due to a long travel distance of the slide 14 and the focusing unit 12. Thus, it can be said that in case of real laser sources 4, due to the non-ideal characteristics of the laser sources 4, there are deviations between the measured or detected, respectively, actual power of the laser source 4 and the specified target power by the PWM pulse 19. This effect varies with frequency and duty cycle, in particular pulse duration, leading to undesirable application results.

According to the present disclosure, it is now envisioned that in order to improve the quality or to reduce this effect, respectively, a correction process 21 is carried out in which the PWM signal 19 is optimized accordingly. This correction process 21 can be integrated or act, respectively, at a wide variety of points, as shown below in FIGS. 3 to 5. Thereby, at a defined edge 22 of the PWM signal 19, in particular the falling edge 22, the correction process 21 for generating a preferably modified PWM signal 19*a*, in particular a changed PWM signal 19*a* or a laser control signal 19*a*, is synchronized or performed, respectively. The correction process 21 determines the preceding pause duration 23 and the pulse duration 24, from which a correction value 25 or correction factor 25, respectively, is determined or calculated, respectively, according to a stored algorithm, as can be seen from the schematic diagram in FIG. 2. I.e., at the start of the machining process, in particular when positioning the focusing unit 12, the parameters of the pause duration 23, i.e. the time during which no PWM signal 19 is generated or emitted, and the pulse duration 24 are continuously recorded so that the correction process 21 can access and process parameters—pause duration 23 and pulse duration 24—at any time. In this case, it is possible that the pulse durations 24, which are already known due to the analysis of the job before processing, are also transferred by the controller 13.

It is crucial to carry out the calculation of the correction factor 25 from at least the two parameters of the previously lying pause duration 23 and the pulse duration 24, whereby the original PWM signal 19 is modified, so that a modified PWM signal 19*a* is applied to the irradiation source 4, so that the laser beam 10 is generated, in particular lengthened or shortened, by the laser source 4 in accordance with the changed PWM signal 19*a*. In particular, the use of the previous pulse pause or pause duration 23, respectively, has a significant impact on the quality of the machining process, in particular of the engraving, since the changed response behavior of the laser 4,5, in particular of the laser source 4, can be inferred or taken into account. For if there is a longer pause between two pulse durations 24, the response behavior of the laser source 4 changes so that the source cannot immediately deliver the desired power when triggered again. In particular with low laser powers and with very fine engravings, this can lead to this not being visible on the workpiece 7, but this is corrected by the correction process 21, since the essential parameters are taken into account.

Figure 2:
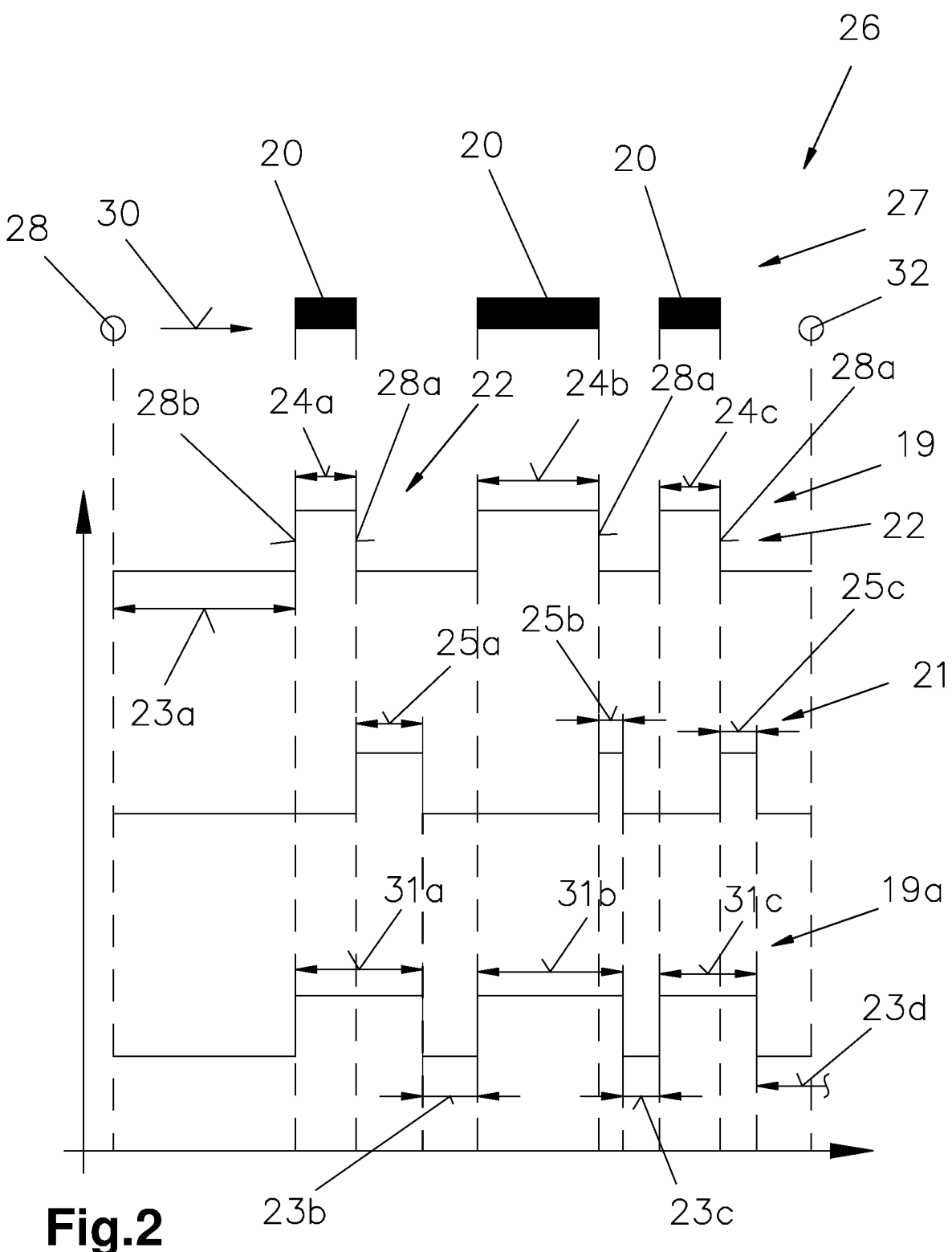
FIG. 2 is a section of a signal course of the machining process for one line with correction process, simplified, for illustrative purposes only.

For better illustration, a simplified representation of a signal curve 26 is shown in FIG. 2. On the one hand, the image information 27 from the job to be processed, the PWM signal 19, the correction value 25 and the modified PWM signal 19*a* for controlling the laser source 4 are shown in chronological order. Here, based on the job to be processed, the positions of the carriage 14 and the focusing unit 12 at which the laser beam 10 is switched on and switched off again depending on the duration are known. These positions are shown in the signal curve 26 as image information 27.

Basically it can be said that in the pulse pauses 23 the carriage 14 and/or the focusing unit 12 with deactivated laser beam 10 are adjusted, whereas in the image information 27 solely the focusing unit 12 with activated laser beam 10 is adjusted for processing the workpiece 7. By using a mechanical drive, in particular a belt drive, it is not possible for a defined, in particular ideal, pulse pause 23 to be predetermined for adjusting the slide 14 and/or the focusing unit 12, since the adjustment period can always change slightly, so that monitoring of the signals, in particular the PWM signal 19 is essential to substantially increase the quality of the machining process.

In the signal curve 26 of FIG. 2, for example, an exemplary embodiment of the first line of the machining process is shown in which triggering is performed on a falling edge 28*a* of a PWM signal 19. At the beginning of the process, the focusing unit 12 is first manually adjusted from the starting position 29, in particular the rest position of the laser plotter 2, to the starting point according to arrow 30, whereby the pause duration 23*a* is already monitored and recorded from the beginning of the adjustment. After the machining process has been started, i.e. at the beginning of the first pulse duration 24*a*, the length of the pulse duration 24*a* is also detected by the correction process 21, whereby at the end of the pulse duration 24*a*, i.e. the falling edge 28*a*, the correction process 21 determines a corresponding correction value 25*a* for the first pulse duration 24*a* and updates the PWM signal 19, so that a corrected PWM signal 19*a* with a corrected pulse duration 31*a*, in particular a laser control signal 31*a*, is further transmitted to the laser source 4, so that the laser source 4 is now activated for the laser duration corresponding to the corrected pulse duration 31*a*. It can be seen that the normally calculated pulse signal 19 with a pulse duration 24*a* is extended by the correction value 25*a*. For the sake of completeness, it is mentioned that shortening is also possible.

Then, again, the correction process 21 will apply the following pause duration 23*b*, but now from the corrected PWM signal 19*a* to the next PWM signal 19 or 19*a*, respectively. When the next PWM signal 19 is generated, a corrected PWM pulse 19*a* is also generated in synchronization with it and sent to the laser source 4, whereby the pulse duration 24*b* up to the next falling edge 28 is monitored and recorded and processed to determine the next correction value 25*b*, creating a new corrected pulse duration 31*b* for controlling the laser source 4. This process is repeated until the laser plotter 2 has reached the end position 32 in this line and changes to the next line. Thereby the transition is detected practically from the end position 32 to the next PWM signal 19 or 19*a*, respectively, as schematically shown by the pause duration 23*d*, so that the entire adjustment process is considered.

As can be seen from the signal curve 26 of FIG. 2, the correction process 21 substantially modifies the PWM signal 19, calculated from the job, to the corrected PWM signal 19*a* to improve the quality of the processing. Here, the changes are not made statically by continuously extending the PWM signal 19, as is done in the prior art, but the dynamic parameters, in particular the pause duration 23, which changes constantly due to the image content and the mechanical drive, are also taken into account, i.e. the acceleration, the adjustment path, braking path, etc., which play a significant role, are also taken into account via the pause duration 23 and pulse duration 24 when the carriage 14 is moved. The generation of a PWM signal 19 or 19*a*, respectively, is performed only when the carriage 14 and the focusing unit 12 have reached the actual position or immediately before, respectively.

Furthermore, it is possible that for calculation of the correction value 25, in addition to the parameters of the pause duration 23 and the pulse duration 24, other information such as the temperature of the laser source 4, the positions of the machining process, the necessary quality, in particular the desired number of dpi, (→resolution) can also be taken into account. These can be set or determined at the beginning of a process so that the correction process 21 is adapted accordingly. It is also possible that triggering can be performed or set, respectively, on the rising edge 28*b* of a PWM signal 19 or pulse 19 or 19*a*, respectively, since the PWM signals 19 are known by the image information when the job is processed, so that the pulse duration 24*a* is taken over from the known job positions or can be acquired in turn and the calculation of the correction value 25 can be performed subsequently or immediately, respectively. Thus, it is also possible that only the pause duration 23 is acquired by this and the pulse duration 24 is taken over, with triggering or synchronization, respectively, taking place via the edges 28.

In the exemplary embodiment described in FIG. 2, the correction process 21 is performed after the PWM signal 19 is generated in the PWM generator or pulse generator 33, respectively. This can be done directly in the pulse generator

Figure 3:
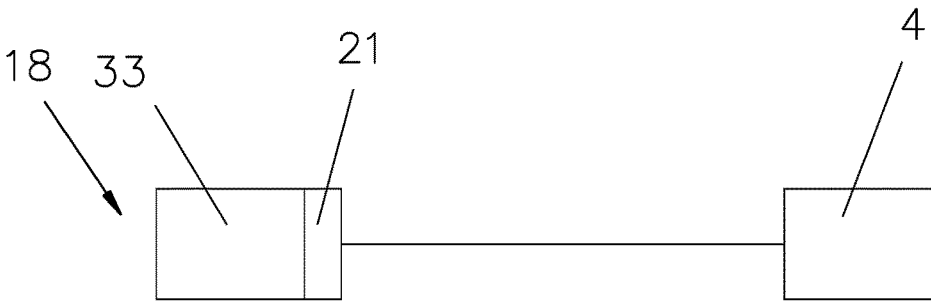
FIG. 3 is a block diagram for the application of the correction process, simplified, for illustrative purposes only.
Figure 4:
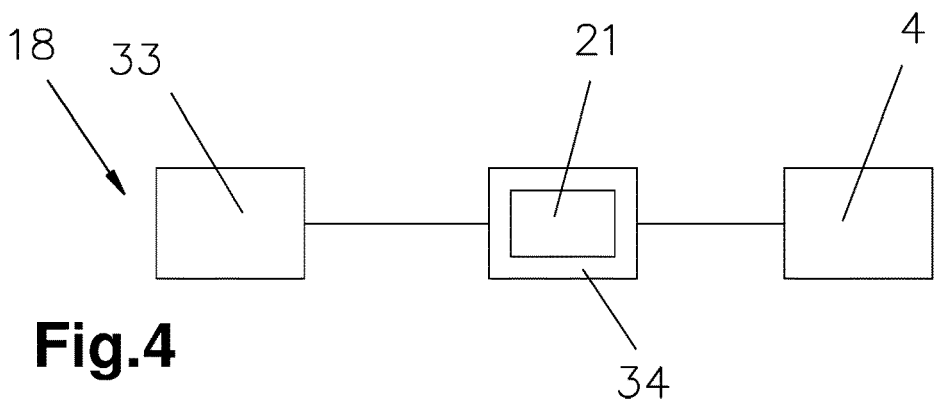
FIG. 4 is another block diagram for a further application of the correction process in an additional control module, simplified, for illustrative purposes only.
Figure 5:
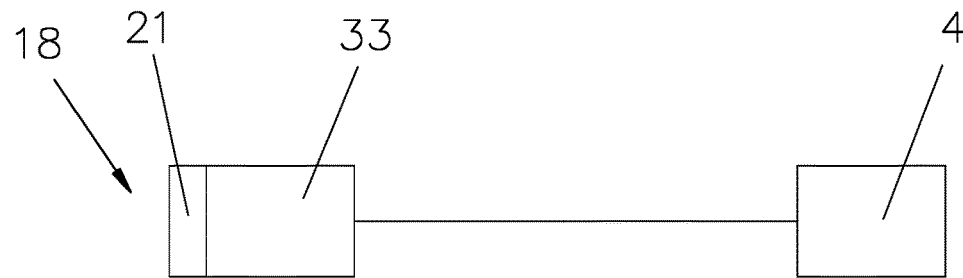
FIG. 5 is a block diagram for the application of the correction process before the PWM generator or pulse generator, respectively, simplified, for illustrative purposes only.
Figure 6:
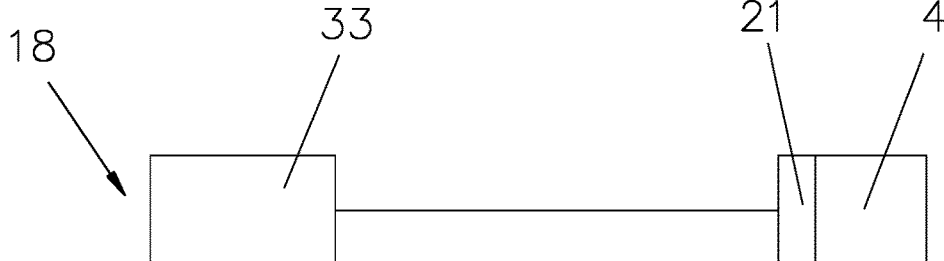
FIG. 6 is a block diagram for the application of the correction process in the laser source, simplified, for illustrative purposes only.

33, as shown in FIG. 3, or in a separate control module 34, as shown in FIG. 4, which is integrated between the pulse generator 33 and the laser source 4. Of course, it is also possible to integrate the correction process 21 already during the generation of the PWM signal 19, i.e. before the pulse generator 33 according to FIG. 5, so that the corrected PWM signal 19*a* is generated directly and thus no PWM signal 19 is present. Furthermore, a variant is possible in which the correction process 21 is also directly integrated into the laser source 4, in particular its control unit.

As a matter of principle, it should be mentioned that the PWM signals 19 are generated corresponding to the image positions 27, so no continuous PWM signal 19 is generated, but a PWM signal 19, 19*a* related to the position is.

Through the integration in an additional control module 34, according to FIG. 4, it is possible that already existing laser plotter types 1 can be retrofitted with it, i.e. that older laser plotters 2 can be improved by retrofitting the control module 34, since the control module 34 is designed in such a way that the incoming PWM signal 19, in particular the pulse duration 24 and the pause duration 23 are detected and corrected accordingly with the integrated correction process 21, so that subsequently the corrected PWM signal 19*a* is transmitted further. Here, the control module 34 can operate independently of other components. This only needs to be supplied with power and does not require any connection to the controller 13 of the laser plotter 2.

The correction process 21 allows fine engravable details to be thereby made visible at high engraving speeds, in particular in the case of fine lines transverse to the direction of travel of the carriage 14. Furthermore, a lower power of the laser 5,6 can be selected, since the fine details are improved, whereas in the prior art a high power setting is selected to display the fine lines, which has the disadvantage that the fine lines are displayed, but the coarser engravings are removed excessively and other laser problems, such as tailing (afterglow of the laser source resulting in a blurred engraving), are aggravated.

For the sake of completeness, it is mentioned that the correction process 21 runs from the start of the positioning of the focusing unit 12 or from the switching on of the laser plotter 2, respectively, until the laser plotter 2 is shut down or switched off, in particular the monitoring of the pulse duration 23.

It is furthermore mentioned that in the exemplary embodiment shown, the pause duration 23,23*a,b,c*, . . . and the pulse duration 24, 24*a,b,c*, . . . are not limited to the number shown, but consist of a plurality of pause durations 23,23*a, b,c*, . . . and pulse durations 24, 24*a,b,c*, . . . which are, however, not shown for the sake of clarity. The number of pause durations 23,23*a,b,c*, . . . and the pulse duration 24, 24*a,b,c*, . . . depends on the job to be processed or the engraving to be created. The same applies to the correction value (25,25*a,b,c*, . . . ) or correction factor (25,25*a,b,c*, . . . ), respectively.

It is advantageous if the parameters of the corrected PWM signal 19*a* are used for the correction process 21, i.e. the pulse duration 24 and the pause duration 24 are acquired directly from the corrected PWM signal 19*a*, since this evaluates that signal that controls the laser source 4.

Furthermore, individual features or combinations of features from the various exemplary embodiments shown and described can also form independent, inventive solutions or solutions according to the present disclosure.

What is claimed is:

1. A method for defining a laser control signal for a laser source for various laser machine types for cutting, engraving, marking and/or lettering of a workpiece, in which at least one laser source for processing a workpiece is used in a housing of the laser machine type, wherein a PWM signal for controlling the at least one laser source is generated by a control unit from set parameters and/or a loaded job, wherein the workpiece is deposited on a processing table and the processing of the workpiece is carried out line by line, wherein, for each line a separate PWM signal is generated for controlling the at least one laser source, wherein at a defined edge of a first PWM signal, a correction process is carried out for generating a modified second PWM signal, whereby the correction process modifies a preceding pause duration and a pulse duration, from which a correction value and a correction factor, respectively, are determined, and wherein the second PWM signal is modified by extending the first PWM signal having the pulse duration by the correction value after which a subsequent pause duration is determined by the correction process from the second PWM signal up to a third IM signal.

2. The method according to claim 1, wherein, after the start of the correction process, a duration of the preceding pause duration and the duration of the pulse duration of the second PWM signal are first determined.

3. The method according to claim 1, wherein, depending on the length of the duration for the laser pause or pause duration, respectively, the correction value or the correction factor are determined for the second PWM signal based on a length of the preceding pause duration of the pulse duration, respectively.

4. The method according to claim 1, wherein the correction process is carried out in a separate control module.

5. The method according to claim 1, wherein the correction process in a pulse generator is carried out after the generated second PWM signal.

6. The method according to claim 5, wherein the correction process is integrated before the pulse generator directly during the generation of the second PWM signal.

7. The method according to claim 1, wherein the correction process is integrated into the control unit or the laser source.

8. A laser plotter for engraving, marking and/or lettering of a workpiece, which comprises a processing chamber for positioning the workpiece, the at least one laser source with corresponding deflection elements and a movable focusing unit and the control unit for controlling a carriage, which is operated via a belt drive and has a focusing unit movably arranged thereon, wherein the laser plotter, a PWM generator, a pulse generator, a control module or the at least one laser source, is configured to define a laser control signal or the modified second PWM signal, respectively, for the at least one laser source, for cutting, engraving, marking and/or lettering of the workpiece by the correction process according to claim 1.

9. A galvo marking laser for engraving, marking and/or lettering of a workpiece, which comprises a processing chamber for positioning the workpiece, the at least one laser source with corresponding deflection elements and a movable focusing unit and the control unit, wherein the galvo marking laser, a PWM generator, a pulse generator, a control module or the at least one laser source, for defining a laser control signal or the modified second PWM signal for the at least one laser source, for cutting, engraving, marking and/or lettering of the workpiece by the correction process according to claim 1.

* * * * *